(12) United States Patent
Tabesh et al.

(10) Patent No.: US 7,742,649 B2
(45) Date of Patent: *Jun. 22, 2010

(54) METHOD AND SYSTEM FOR IMAGE COMPRESSION USING IMAGE SYMMETRY

(75) Inventors: Ali Tabesh, Tucson, AZ (US); Duanfeng He, South Setauket, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/766,228

(22) Filed: Jun. 21, 2007

(65) Prior Publication Data

US 2007/0248275 A1  Oct. 25, 2007

Related U.S. Application Data

(63) Continuation of application No. 10/321,911, filed on Dec. 17, 2002, now Pat. No. 7,254,275.

(51) Int. Cl.
G06K 9/46 (2006.01)
G06K 9/36 (2006.01)

(52) U.S. Cl. .................. 382/248; 382/239; 382/243

(58) Field of Classification Search .............. None
See application file for complete search history.

(56) References Cited

U.S. PATENT DOCUMENTS 5,719,951 A * 2/1998 Shackleton et al. ......... 382/118
6,292,575 B1 * 9/2001 Bortolussi et al. .......... 382/118
6,681,032 B2 * 1/2004 Bortolussi et al. .......... 382/118
6,996,257 B2 * 2/2006 Wang ......................... 382/118
7,054,468 B2 * 5/2006 Yang .......................... 382/118
7,254,275 B2   8/2007 Tabesh et al.

OTHER PUBLICATIONS

Kirby, M.; Sirovich, L.; "Application of the Karhunen-Loeve Procedure for the Characterization of Human Faces" Pattern Analysis and Machine Intelligence, IEEE Transactions on; vol. 12, Issue 1, Jan. 1990 pp. 103-108.*
Office Action dated Nov. 30, 2006 in related case U.S. Appl. No. 10/321,911.
Advisory Action dated Sep. 26, 2006 in related case U.S. Appl. No. 10/321,911.
Final Office Action dated Jul. 13, 2006 in related case U.S. Appl. No. 10/321,911.
Office Action dated Mar. 14, 2006 in related case U.S. Appl. No. 10/321,911.

* cited by examiner

*Primary Examiner*—Yuzhen Ge

(57) ABSTRACT

An image compression system and method is described, which makes use of the symmetry found in faces and heads to perform the compression. The image is divided along the line of symmetry, and pairs of corresponding pixels on the two divided sides are determined. A weighted average and a weighted variance of the pixel values of the pairs is computed, and is used to encode the image. A transform such as the Karhunen-Loeve transform is used to compute the weighted averages and variances.

17 Claims, 2 Drawing Sheets

METHOD AND SYSTEM FOR IMAGE COMPRESSION USING IMAGE SYMMETRY

PRIORITY CLAIM

This application is a Continuation application of U.S. Pat. application Ser. No. 10/321,911 filed on Dec. 17, 2002 now U.S. Pat. No. 7,254,275 entitled "Method and System for Image Compression Using Image Symmetry". The entire disclosure of this prior application is considered as being part of the disclosure of the accompanying application and hereby expressly incorporated by reference herein.

FIELD OF THE INVENTION

The present invention relates to methods and systems for compressing images using the symmetry of the image.

BACKGROUND

A recurring problem that is evident in a variety of technologies is that of storing information so that it requires the least possible amount of resources. This information may be in the form of computer data, words, pictures or information presented in other formats, and may be converted from one type of data to another in the storage process. One application of particular importance is the ability to store data that can be used to positively identify a person, as part of a security system. The information that needs to be stored for that purpose includes photographs, fingerprints, signatures and any other data that can establish a person's identity.

The success of many systems using large amounts of stored information often lies in the ability to compress the data representing that information, so that it is made available in an inexpensive manner anywhere it is needed. In the case of identification systems, it is useful to incorporate in identification cards sufficient information to positively identify a person. The data should also be in a format that cannot be easily forged or altered. At the same time, the information cannot occupy an excessive amount of storage, computer memory or physical space, depending on its format, since that translates in additional cost or size of the identification device. More generally, any system using large amounts of data benefits from storing that data in a more efficient and inexpensive manner.

In many systems that access data in a decentralized manner, such as in systems used for the identification of persons, an additional requirement is that all necessary data be accessible without having to connect to a data base, computer network, or other central information system. Sufficient information has to be stored at the remote locations so it may be reviewed without connecting to a communications system. To store the additional data efficiently, sophisticated compression methods must be used, to fit as much data as possible in a restricted storage, or to minimize the storage required. In particular, images of a person's face may have to be stored for identification purposes, but photographs generally require a large amount of storage to be saved. Improved compression methods may increase the usefulness of identification methods that use facial recognition to identify a subject.

SUMMARY OF THE INVENTION

In one aspect, embodiments of the present invention include a method for reducing an image representing a substantially symmetric subject, comprising dividing the image into a first part and a second part substantially symmetric to the first part, determining pairs of symmetrically corresponding pixels, a member of the pair in the first part having an X pixel value and a member of the pair in the second part having a Y pixel value, computing a weighted average value A of each one of the pairs and computing a weighted variance value B of each one of the pairs. The method further includes representing each of the pairs with the weighted average and the weighted variance values and generating a reduced image comprising at least a plurality of the pairs.

In another aspect, the present invention is a system for processing an image substantially symmetric along a line of symmetry. The system includes a software module configured to process pixel values of pixels representing the image, the software module being adapted to divide the image substantially along the line of symmetry, determine pairs of corresponding pixels, each pixel on a side of the divided image, compute a weighted average and a weighted variance of each of the pairs, and generate a reduced image from at least the weighted average and the weighted variance of the pairs. The system also includes a storage media adapted for storing the reduced image.

DETAILED DESCRIPTION

Figure 1:
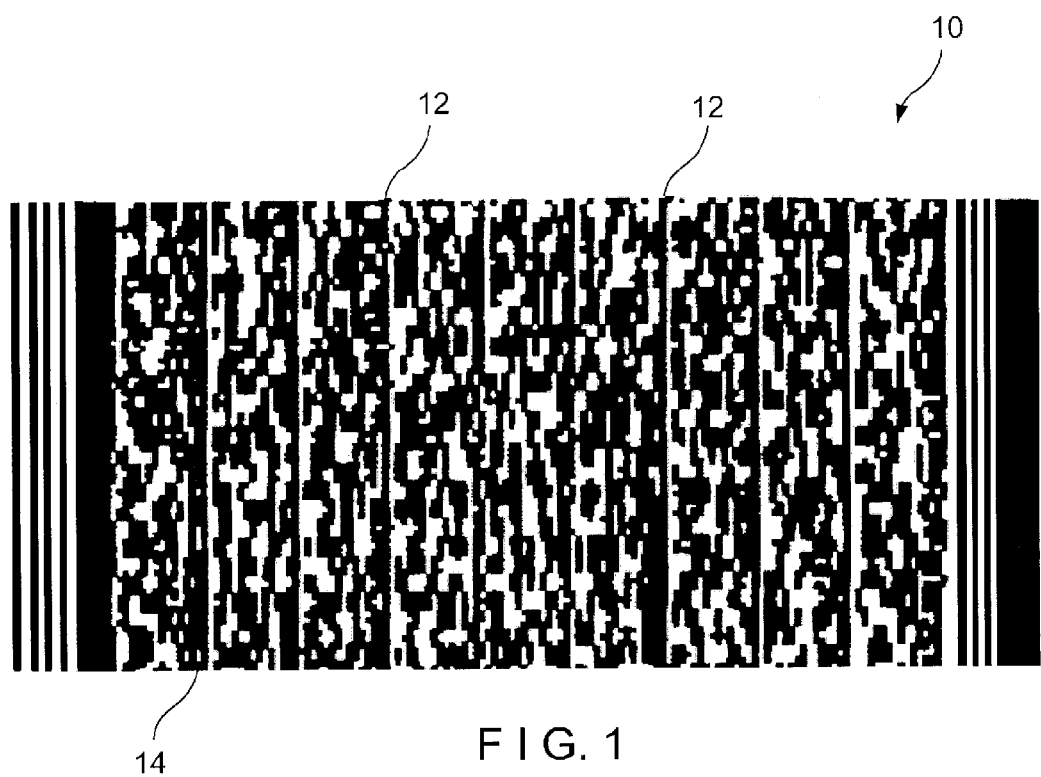
FIG. 1 is a diagram showing an exemplary 2D barcode storage media according to an embodiment of the present invention.

The present invention may be further understood with reference to the following description and the appended drawings, wherein like elements are referred to with the same reference numerals. The requirement to efficiently and accurately store large amounts of data using limited resources is common to many different fields. In particular, storing images in a format that is useable by machines typically requires significant resources, such as magnetic or optical storage media used by microprocessors, printed codes like the one dimensional or two dimensional (2D) barcodes, or resources used by other storage technologies. In many applications, the storage must also be inexpensive, and must work in adverse conditions, without requiring specialized support.

Various image compression techniques have been developed, which include fast Fourier Transform (FFT) or cosine transform methods such as those used in Joint Photographic Experts Group (JPEG) algorithms, and wavelet transform based algorithms (e.g., JPEG2000). Although these methods significantly reduce the size of data files representing an image, they may not compress the data files sufficiently for certain applications. For example, in many applications it is necessary to store an image using a barcode printed on a surface. Using a PDF-417 2D barcode, it is possible to store about 1 Kilobyte of data, which may not all be available to store the image. A suitable optical scanner may then be used to read the data stored in the 2D barcode, and suitable processing may be used to retrieve the data and images stored therein.

The ability to store a compressed image, as well as additional information in a single 2D barcode, or in a different type of rugged media, allows for developing simple and accurate identification systems. For example, an identification card with encoded biometric information may be used which is rugged and difficult to tamper. The identification card may include a 2D barcode containing, for example, an encoded picture of the card's owner and additional information such as a signature, fingerprint, additional biometric data or additional textual information. The barcode may be read by any optical scanner coupled to a microprocessor to decode the data. Since all necessary information regarding the card's owner and any other encryption or authentication data is encoded within the 2D barcode, the subject's identity may be verified without having to access a central database via a network. Thus, the system can be used in remote areas and can be very fast since there is no need to connect to a network and interrogate a central database. If the 2D barcode is used as the data storage media, the system may be very inexpensive since the encoded information can be printed on a simple piece of paper. FIG. 1 shows an example of a 2D barcode 10, having a pattern of printed blocks 14 arranged in columns 12 that are used to encode the data.

One disadvantage of portable, inexpensive storage media is the limited amount of data that can be stored therein. For example, if the PDF-417 2D barcode is used, the addition of additional biometric data may reduce the amount of space available to store an image to around 500 Bytes. A more efficient method of compressing the image is necessary to reduce the image size more than is possible using conventional image compression methods. Systems and methods according to exemplary embodiments of the present invention take advantage of the symmetry present in human heads and faces to further compress the data describing the image of a face. A facial image may be divided along a nearly vertical line of symmetry, such that the right and left halves of the image are nearly mirror images of each other. Hypothetically, using the symmetry compression method of the present invention without any additional conventional compression methods, the storage required for the data representing an image having perfect symmetry could be reduced by 50%. As described below, however, the imperfect symmetry of human faces and additional factors may reduce this theoretical reduction in size. The system according to the present invention can be applied to data stored using any type of storage media, and is not limited to barcode media. Using the present invention results in storing more data given certain resources, or is storing a given amount of data using fewer resources.

The system according to the invention uses as a starting point a machine readable rendition of an image which is substantially symmetric about a line of symmetry. Although one application envisioned for this system involves compressing facial images, it will be apparent to those skilled in the art that any other symmetric image may be treated in the same manner. In one exemplary embodiment, an image of a face is obtained using a digital camera, a scanner and a conventional photograph, or any other method of generating data representing the face. A software module executing on a microprocessor may be configured to process the image, and carry out the steps of the compression process. Initially the image is divided into a first part and a second part which are substantially symmetric with one another. In one example, the software module simply divides the image into two generally symmetrical halves, along the geometrical center of the image. In the case of a facial image, such as the one shown in FIG. 2, this step involves dividing the image 20 along a vertical line generally parallel to the image edges, which are assumed to be nearly parallel to axis of symmetry 24. This operation requires very little computing, but may not result in strong image compression unless the face 22 rendered in image 20 is very symmetric, and is well centered in image 20.

A more complex method may be used to divide the image 20 in two symmetrical parts, while taking into account possible asymmetries. For example, the software module may mathematically compute the location of line of symmetry 24 and may divide the image along the computed line 24. This method results in first and second parts that are more accurately symmetrical, but requires more computational resources at the beginning of the operation. Greater compression can be achieved in this manner, especially in cases where the face 22 is not well centered in image 20, at the cost of increased computational requirements. Additional precautions may be used externally of the software module to reduce asymmetries of image 20. For example, care may be taken when the subject poses for the image to center the depiction of face 22 in image 20, and to ensure that the head is not tilted excessively. The effects of an asymmetrical image 20 can therefore be mitigated by controlling the subject's pose for the image 20, by performing corrections computationally after the image is generated, or by a combination of both methods.

Another source of image asymmetry can be traced to uneven lighting of the subject when the image is generated. In this case, the image may be geometrically symmetric, however the pixel values of corresponding pixels found in the two parts of the image are different. The pixel values, such as color, hue, intensity, etc. define not only the shape of the image, but also the brightness and colors of the image, therefore a small asymmetry in the illumination of the subject can result in significant asymmetry of the resulting image. These effects can be reduced according to embodiments of the present invention by controlling the illumination of the subject when generating the image, and/or by numerically processing the image through an algorithm that normalizes the image to a more constant brightness.

Figure 2:
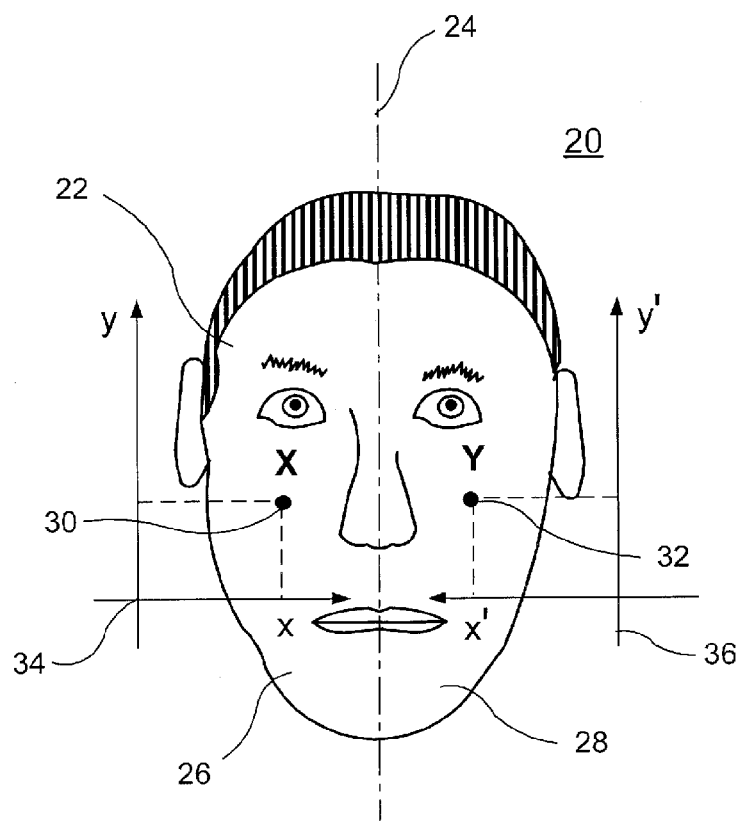
FIG. 2 is a diagram showing an image of a face and associated reference elements according to an embodiment of the present invention.

Once the pre-processing of the image is completed, the symmetry based compression can take place. According to an exemplary embodiment, the software module determines pairs of symmetrically corresponding pixels, one pixel of the pair being in the first part of the image, and another pixel of the pair being in the second part of the image. As shown in FIG. 2, the first pixel 30 of the pair has a pixel value X, and is located in first side 26 of image 22. The second pixel 32 has a pixel value Y, and is located in second part 28 of image 20. In the context of this application, pixel 30 (value X) corresponds to pixel 32 (value Y) in the sense that if image 20 is folded over along line of symmetry 24, pixels 30 and 32 substantially overlap. Any suitable method to correlate the pixels 30 and 32 may be used. For example, a coordinate system 34 with x and y axes may be used to describe the location of pixel 30, and a mirror image coordinate system 36 with x' and y' axes may describe the location of pixel 32. Alternatively, a single coordinate system may be used, with the pixels in first part 26 being translated relative to the pixels in second part 28. As will be apparent to those skilled in the art, any other method may be used which provides a mapping between the pixels 30 of the first part 26 and the pixels 32 of the second part 28.

The exemplary method to compress image 20 involves computing two values for each pair of corresponding pixels. By repeating this process for each pair of pixels describing image 20, data for a reduced image derived from image 20 can be generated, which represents the entirety of image 20. A first value A computed for each pair of pixels is a weighted average of the pixel values X and Y for pixels 30, 32 of the pair. A second value B is a weighted variance of the pixel values, which essentially represents a measure of how symmetric pixel values X and Y are. The more symmetric the pixels in the pair, the smaller the value of B. In one exemplary embodiment, A and B are computed as follows:

$$A = k_{11}X + k_{12}Y$$

$$B = k_{21}X + k_{22}Y$$

Here, the values $k_{ij}$ (for i=1,2 and j=1,2) are elements of a transform matrix K, which is determined based on the statistical properties of the image 20, as will be described below.

In this exemplary embodiment, the transform matrix K is a Karhunen-Loeve (KL) transform. As is known to those of skill in the art, KL transforms are especially well suited to reduce the dimensions of a set of data that is symmetric along one axis. The reduction is carried out by transforming the base axis of the data using scaling and rotation operations so that the variance of the data along at least one axis or direction is small enough to become negligible. A more thorough discussion of the use and determination of the KL transform matrix may be found in references such as "T. M. Cover and J. A. Thomas, Elements of Information Theory, Wiley, New York, 1991". It is sufficient here to know that the KL transform according to the exemplary embodiment is a 2×2 matrix derived from the second-order statistical properties of the data being processed. In this case, the data represents the pixel values of the pixels making up FIG. 20, and the values of elements $k_{ij}$ of transform matrix K depend on how symmetrical image 20 is relative to line of symmetry 24.

An inverse operation may also be carried out on the set of values A and B, which form the reduce image data. This is done to reconstitute the image 20 from the data that was computed for the reduced image data as described above. According to the exemplary embodiment, the pixel values X and Y for pixels 30, 32 are calculated from the weighted average A and from the weighted variance B for each pair of pixels. After X and Y have been computed for every pair of pixels defining face 22 of image 20, the original image can be regenerated. The reconstituted image may be displayed for comparison with the original image 20, or for identification purposes. In one example, X and Y pixel values for each pixel pair are computed from the corresponding A and B values of the reduce image data as follows:

$$X = l_{11}A + l_{12}B$$

$$Y = l_{21}A + l_{22}B$$

Here, $I_{ij}$ (i=1,2, j=1,2) represents the elements of the L transform, which is the inverse of the transform K, also defined as $L = K^{-1}$. Accordingly, once K has been computed as described above, L can also be computed.

Computing the KL transform for an image and using it to process every pair of corresponding pixels defining the image provides the greatest compression for the image. However, carrying out these calculations requires significant computational resources, and may take a non negligible amount if time to complete. A simplified approach may. be taken, which results in a less efficient compression of the image data but requires considerably fewer resources to carry out the image data compression. In this exemplary simplified approach, the transform K is not a true KL transform, since it is not computed from the statistical properties of the image data. Instead, certain assumptions are made regarding the statistics of the data describing the first and second parts 26, 28 of image 20, and the transform K is simplified to become a constant matrix, which does not have to be computed for every image. The inverse transform L is likewise simplified, and becomes a matrix with constant values. In one exemplary embodiment, the K and L transforms are:

$$K = \begin{matrix} 1/2 & 1/2 \\ 1/2 & -1/2 \end{matrix}$$

and $$L = \begin{matrix} 1 & 1 \\ 1 & -1 \end{matrix}$$

This simplification assumes that A and B are perfectly correlated and have the same variance (e.g., that image 20 is perfectly symmetrical). If these assumptions are not met by the actual image 20, the image will still be compressed, but not to an optimized level.

Once the X and Y pixel values for pixels 30, 32 of each pair in image 20 have been computed, the image may be reconstituted by recombining the pixels of the two halves to complete the image. An additional processing step may have to be carried out after the two image halves are rejoined, to eliminate a seam line that may appear on the line of symmetry 24 along which the image 20 was divided. This seam line generally passes through the center of face 22, and is easily noticed by a human observer. The seam line appears because the image may lose its continuity along the division between first part 26 and second part 28 as a result of some additional image compression steps, which will be described below. In any image, a particular pixel value may change more or less as a result of compression. If the computed B value of pixel pairs near the line of symmetry becomes large, a seam line may become visible in the reconstructed image after de-compression. This seam line is an artifact due to the manipulation of the pixel values by lossy image compression algorithms. This seam line is easily visible and usually visually disturbing to the human eye.

Several methods may be employed to remove the seam line from the reconstituted image. In one method, the absolute value of B (|B|) is compared to the absolute value of the difference between A values of adjacent pairs of pixels (|Delta (A)|), in a small neighborhood adjacent to the seam line. If it is found that |B|>|Delta(A)|, the value |B| is gradually reduced towards the seam line. A second method to suppress the seam line involves using an averaging or interpolation technique, such as cubic spline techniques, to reconstruct the pixel values near the seam. In this method, the pixel values of pixels located near the seam may be give a lesser weight than the pixel values of pixels further away from the seam line.

After the initial image compression using facial symmetry has been carried out, additional reduction in size of the image data file may be obtained by processing the reduced image data with conventional image processing software. For example, the reduced image data may be processed with JPEG 2000 to further reduce the amount of data that has to be stored. This additional step is especially indicated in cases where an image of a face is to be stored with additional encoded information on an identification card, for example using a 2D barcode format. The image regeneration is carried out as described above, except that the JPEG 2000 or other compression software decoding is performed first, to obtain the reduce image.

The symmetry based compression method of the present invention is a lossless method except for numerical round off errors, meaning that the original image can be fully recovered. However, many other compression algorithms, such as those listed above, can provide more compression but often use lossy schemes. This means that after the lossy compression step, the original data cannot be exactly recovered by a reverse step. In the context of the present invention, the original pixel values X, Y are used to derive the values A, B using the symmetric compression step. If A, B are further compressed and then decompressed using a lossy scheme, new values A', B' are retrieved. A', B'0 are then used to compute pixel values X', Y' which are nearly but not exactly identical to the original pixel values X, Y. As described above, this loss in the decompression step may result in a seam line being visible in the reconstituted image.

Figure 3:
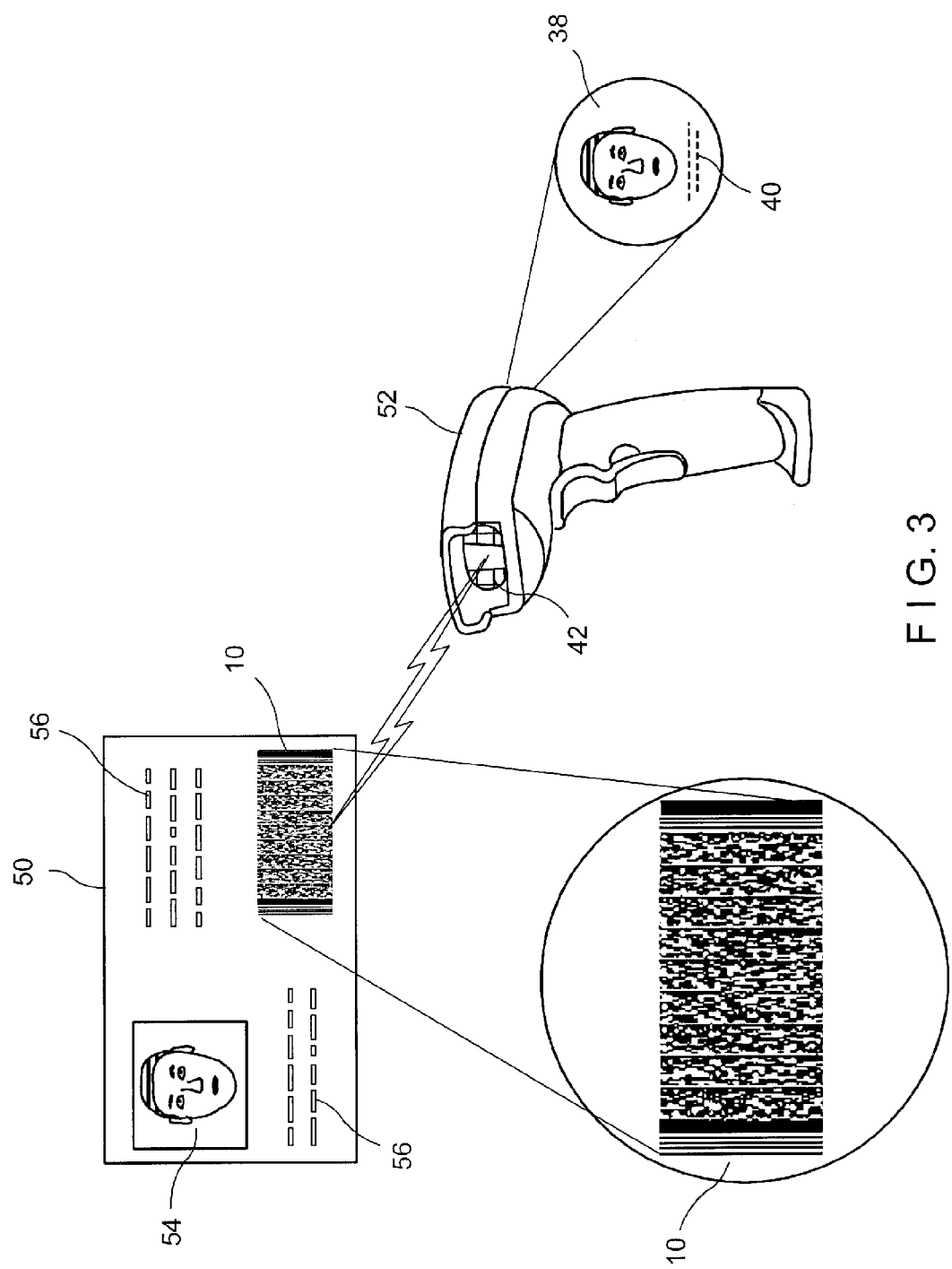
FIG. 3 is a diagram showing an exemplary embodiment of an identification system according to the present invention.

FIG. 3 shows a diagram of an exemplary identification system that uses an image compression method according to the present invention. According to the exemplary system, an identification card 30 is issued to a subject. Identification card 30 includes an image 34, (e.g., a facial picture of the subject) and various other data 36 (e.g., text data, a signature, encoded data, etc.). A 2D barcode 10 is also included on the identification card 30, containing a local database of information pertaining to the subject. For example, image 34 may be processed as described above to compute the A and B values of pixel pairs. The reduced image data so obtained may be further compressed using conventional image processing algorithms, and may be stored on the 2D barcode. In addition, data 36, as well as any encryption and biometric information deemed useful, may be stored in barcode 10.

Verifying the identity of the subject is a simple is a simple matter with the help of the identification card 30 including 2D barcode 10. In addition to the conventional matching to the subject of image 34 and data 36, both of which can easily be altered, the data contained in 2D barcode 10 can be easily reviewed. A scanner 32 may be used to read the 2D barcode 10 using, for example, an optical reader 42. Scanner 32 may use a microprocessor to decompress the data in 2D barcode 10, as described above, and reconstitute an image 38 and additional information 40 from the compressed data. The image 38 and data 40 may be displayed on a display module, so that the user of scanner 32 is able to compare it to the subject's appearance and to the image 34 and data 36 shown on ID card 10. Additional information about the subject may also be included, which is not openly visible on the ID card 10. An important feature of this system is that scanner 32 is a stand alone system, which does not have to be connected to any network of database, since all the necessary information is encoded in 2D barcode 10. The same result may be obtained by storing the reduced image data and the additional information in a different type of storage media which may be included on ID card 10.

The present invention has been described with reference to specific embodiments associated with facial images and specific formats of data storage. However, other embodiments may be devised that use different data technologies without departing from the scope of the invention. Accordingly, various modifications and changes may be made to the embodiments without departing from the broadest spirit and scope of the present invention as set forth in the claims that follow. The specification and drawings are accordingly to be regarded in an illustrative rather than restrictive sense.

What is claimed is:

1. A computer-implemented method for reducing an image representing a substantially symmetric subject, comprising the steps of:

dividing the image into a first part and a second part, the second part being substantially symmetric to the first part;

determining pairs of symmetrically corresponding pixels, a member of the pair in the first part having an X pixel value and a member of the pair in the second part having a Y pixel value;

computing a weighted average value A of the pixel values of each one of the pairs;

computing a weighted variance value B of the pixel values of each one of the pairs;

representing each of the pairs with the weighted average and the weighted variance values;

generating reduced image data including at least a plurality of A values and corresponding B values the pairs;

reconstituting the image by computing the X pixel value and the Y pixel value from the weighted average value A and the weighted variance value B; and compressing the reduced image data with an image compression algorithm, wherein the reconstituting step further includes the substep of removing visual artifacts from the reconstituted image, wherein the visual artifacts comprise a seam line between the first part and the second part, wherein the dividing, determining, computing, representing and generating steps are executed by a microprocessor.

2. The method according to claim 1, further comprising the step of:

reconstituting the image by computing the X pixel value and the Y pixel value from the weighted average value A and the weighted variance value B using a scanner.

3. The method according to claim 2, further comprising the step of:

reconstituting the image as a function of an inverse transformation matrix L so that $$X = l11 A + l12 B$$

$$Y = l21 A + l22 B$$

wherein l11, l12, l21, and l22 represent the elements of the L transform, based on statistical properties of the image.

4. The method according to claim 3, wherein the transformation matrix L is an inverse Karhunen-Loeve transform.

5. The method according to claim 3, wherein the transformation matrix L is:

$$L = \begin{matrix} 1 & 1 \\ 1 & -1 \end{matrix}.$$

6. The method according to claim 1, further comprising the step of: before the dividing step, reducing a lighting condition asymmetry of the image.

7. The method according to claim 1, further comprising the step of:

before the dividing step, reducing a pose asymmetry of the image.

8. The method according to claim 1, wherein the reduced image data further comprises encoded additional data.

9. The method according to claim 8, wherein the additional data is at least one of text and biometric data.

10. The method according to claim 1, further comprising the step of:

storing the reduced image data on storage media.

11. The method according to claim 10, wherein the storage media is one of a magnetic media, optical media and 2D barcode media.

12. The method according to claim 1, wherein the removing step includes the substeps of averaging and interpolating pixels near the visual artifact.

13. The method according to claim 1, wherein the substantially symmetric subject represents a human face.

14. The method according to claim 1, wherein the image compression algorithm is one of a FFT/Cosine transform algorithm and a wavelet transform algorithm.

15. The method according to claim 1, further comprising the steps of:
   computing a line of symmetry of the image; and dividing the image along the line of symmetry.

16. The method according to claim 1, wherein the weighted average value A and the weighted variance value B are linear functions of the pixel values.

17. A computer-implemented method for reducing an image representing a substantially symmetric subject, comprising the steps of:
   dividing the image into a first part and a second part, the second part being substantially symmetric to the first part;
   determining pairs of symmetrically corresponding pixels, a member of the pair in the first part having an X pixel value and a member of the pair in the second part having a Y pixel value;
   computing a weighted average value A of the pixel values of each one of the pairs;
   computing a weighted variance value B of the pixel values of each one of the pairs;
   representing each of the pairs with the weighted average and the weighted variance values;
   generating reduced image data including at least a plurality of A values and corresponding B values the pairs;
   reconstituting the image by computing the X pixel value and the Y pixel value from the weighted average value A and the weighted variance value B; and
   compressing the reduced image data with an image compression algorithm, wherein the reconstituting step further includes the substep of removing visual artifacts from the reconstituted image, wherein the removing step includes the substeps of comparing the weighted variance value to a difference in weighted average values for adjacent pixels, wherein the dividing, determining, computing, representing and generating steps are executed by a microprocessor.

* * * * *

UNITED STATES PATENT AND TRADEMARK OFFICE
CERTIFICATE OF CORRECTION

PATENT NO. : 7,742,649 B2
APPLICATION NO. : 11/766228
DATED : June 22, 2010
INVENTOR(S) : Tabesh et al.

It is certified that error appears in the above-identified patent and that said Letters Patent is hereby corrected as shown below:

In Column 5, Line 55, delete "may. be" and insert -- may be --, therefor.

In Column 7, Line 6, delete "B'0" and insert -- B' --, therefor.

In Column 7, Line 26, delete "is a simple is a simple" and insert -- is a simple --, therefor.

In Column 7, Line 38, delete "ID card 10." and insert -- ID card 30. --, therefor.

In Column 7, Line 40, delete "ID card 10." and insert -- ID card 30. --, therefor.

In Column 7, Line 43, delete "network of" and insert -- network or --, therefor.

In Column 7, Line 47, delete "ID card 10." and insert -- ID card 30. --, therefor.

In Column 8, Lines 34-36, in Claim 3, delete "$X=I11A+I12B$ $Y=I21A+I22B$" and insert -- $X=I_{11}A+I_{12}B$ $Y=I_{21}A+I_{22}B$ --, therefor.

In Column 8, Line 38, in Claim 3, delete "I11, I12, I21, and I22" and insert -- $I_{11}, I_{12}, I_{21},$ and $I_{22}$ --, therefor.

Signed and Sealed this
Thirteenth Day of November, 2012

David J. Kappos
*Director of the United States Patent and Trademark Office*